United States Patent
Dhong et al.

[11] Patent Number: 5,812,838
[45] Date of Patent: Sep. 22, 1998

[54] BRANCH HISTORY TABLE

[75] Inventors: Sang Hoo Dhong, Austin, Tex.; Perng-Shyong Lin, Hsin-Chu, Taiwan; Joel Abraham Silberman, Austin, Tex.

[73] Assignee: International Business Machines Corporation, Armonk, N.Y.

[21] Appl. No.: 816,628

[22] Filed: Mar. 13, 1997

[51] Int. Cl.[6] ............................................. G06F 9/42
[52] U.S. Cl. ............................................. 395/586
[58] Field of Search ................. 364/DIG. 1, DIG. 2; 395/580, 581, 582, 583, 584, 586, 587

[56] References Cited

U.S. PATENT DOCUMENTS

| | | | |
|---|---|---|---|
| 5,434,985 | 7/1995 | Emma et al. | 395/587 |
| 5,623,614 | 4/1997 | Dyke et al. | 395/587 |
| 5,649,178 | 7/1997 | Blaner et al. | 395/587 |
| 5,761,723 | 6/1998 | Black et al. | 711/144 |

OTHER PUBLICATIONS

Tse-Yu Yeh et al., "Alternative Implementations of Two-Level Adaptive Branch Prediction", Proc. of the Ninth Annual International Symposium on Computer Architecture 1993, pp. 124–134.

*Primary Examiner*—Robert B. Harrell
*Attorney, Agent, or Firm*—Kelly K. Kordzik; Winstead Sechrest & Minick P.C.; Mark E. McBurney

[57] ABSTRACT

In a branch processing unit a branch history table is accessed by a branch instruction address associated with a scanned branch instruction before the entire address has been computed. The branch history table is partitioned into a first memory array associated with even instruction addresses and a second memory array associated with the odd instruction addresses.

19 Claims, 7 Drawing Sheets

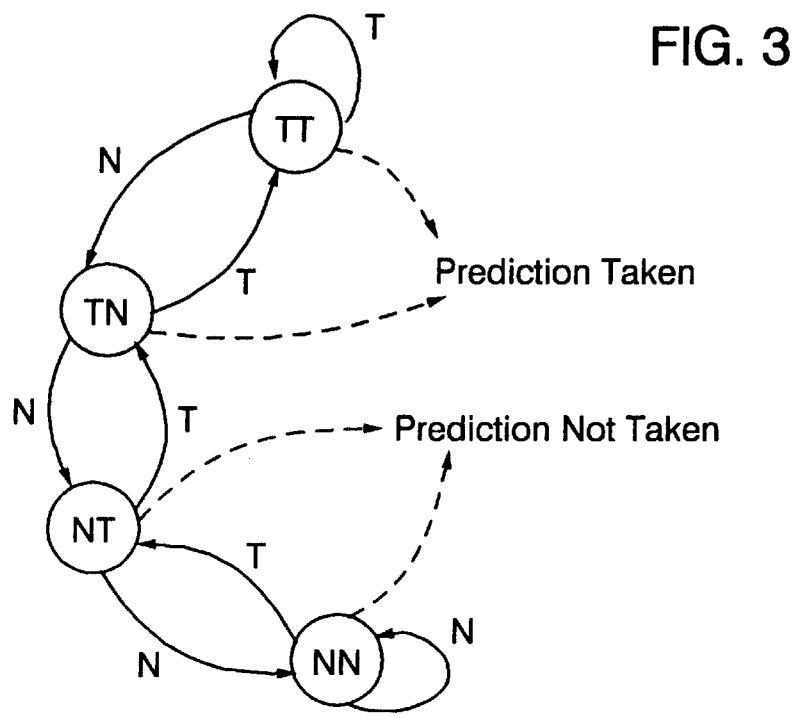
FIG. 3
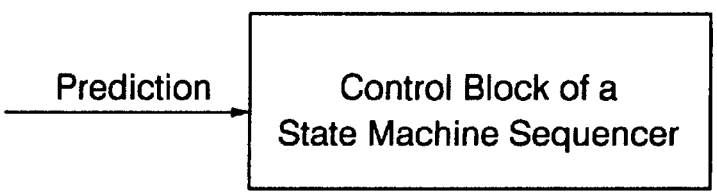
FIG. 4
FIG. 5
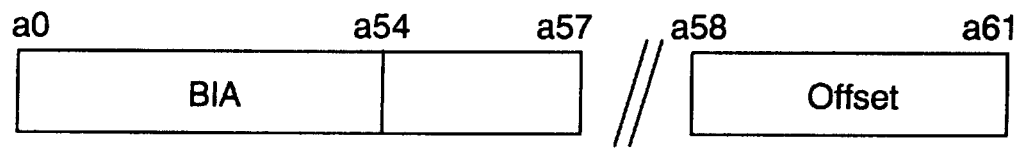

FIG. 6

|  | D1 | D0 |
|---|---|---|
| 00000000 | T | N |
| 00000001 | N | N |
| 00000010 | N | T |
| ⋮ | | |
| 11111111 | T | T |

NN = 00
NT = 01
TN = 10
TT = 11

BRANCH HISTORY TABLE

TECHNICAL FIELD

The present invention relates in general to data processing systems, and in particular, to a branch history table within a microprocessor.

BACKGROUND INFORMATION

A microprocessor implemented with a pipelined architecture enables the microprocessor to have multiple instructions in various stages of execution per clock cycle. In particular, a microprocessor with a pipelined, superscalar architecture can fetch multiple instructions from memory and dispatch multiple instructions to various execution units within the microprocessor for execution in parallel.

A problem with such an architecture is that the program being executed often contains branch instructions, which are machine-level instructions that transfer to another instruction, usually based on some condition (that is, it transfers if a specific condition is true or false). When a branch instruction encounters a data dependency, rather than stalling instruction issue until the dependency is resolved, the microprocessor predicts which path the branch instruction is likely to take, and instructions are fetched and executed along that path. When the data dependency is available for resolution of the aforementioned branch, the branch is evaluated. If the predicted path was correct, program flow continues along that path uninterrupted; otherwise, the processor backs up, and program flow resumes along the correct path.

Branch prediction is the key to enhance and exploit instruction level parallelism. There are two main approaches to branch prediction: One is a static scheme which predicts at compile time, and the other is a dynamic scheme, which uses hardware to capture the dynamic behavior of branches. The accuracy of the branch prediction can determine their performance on deeply pipelined, superscalar processors, since a miss in a branch prediction will incur a drain and restart in the pipeline and thus causes a misprediction penalty.

There are two classes of branch prediction methods: one-level and two-level schemes. One-level schemes use the instruction address to index into a branch history table ("BHT"), which contains the predicted outcome of branch instructions. A small state machine is used to update the contents of the BHT whenever a branch instruction is resolved.

In a machine with many instructions in process, it becomes costly to store the address of each instruction. Methods that reduce this storage requirement are therefore valuable. One scheme partitions the instruction address into a block instruction address ("BIA") and an offset. The BIA may be the upper 58-bits of a 62-bit address, for example, and the offset would then be the remaining 4 bits. Such a scheme reduces the storage requirements because 16 consecutive instructions have addresses represented by a single 58-bit address and 16 4-bit offset values instead of 16 62-bit full addresses. Each unique BIA must be saved. A further storage saving can be achieved if BIAs that differ by only one are not both stored. This situation arises for sequences for instructions for which the offset increments from 16 to 0. Detection of this condition can eliminate the need to separately save both BIA and BIA+1.

The trade-off that accompanies the reduced storage achieved by partitioning addresses into a BIA and an offset is that the instruction address is not directly available at the start of a cycle to access the BHT. Further, detecting whether to use BIA or BIA+1 takes some time. In such a case, the branch prediction process cannot start until the decision signal choosing BIA or BIA+1 is ready, and thus a significant portion of cycle time is wasted. As a result, there is a need in the art for an improved branch prediction process and architecture.

SUMMARY OF THE INVENTION

The present invention addresses the foregoing need by providing a novel memory organization within the BHT, which provides for memory access to begin even though the final branch address has not yet been determined.

More particularly, the present invention provides a method within a data processing system, which comprises the steps of (1) fetching N (wherein N is an integer greater than zero) sequential instructions with an instruction address consisting of a BIA and an offset, (2) storing the N sequential instructions within a buffer, (3) scanning the buffer for a first branch instruction, (4) using the BIA to access a branch history table, (5) computing the offset associated with the first branch instruction, (6) using this offset to also access the branch history table, (7) determining an address particular to the branch instruction, and (8) outputting from the branch history table a prediction of whether or not the branch instruction will be taken, as a function of the address determined within step 7. The accessing of the branch history table with the block instruction address can be performed at the beginning of the branch prediction process, and performed in parallel and independent of the determination of the instruction address particularly associated with the first branch instruction within the buffer.

The branch history table is divided into two separate memory arrays, wherein the first memory array includes predictions associated with even numbered addresses, while the other memory array has predictions associated with odd numbered instruction addresses.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 illustrates a state diagram of prediction bits within a branch history table;

FIG. 4 illustrates use of a prediction by a state machine sequencer;

FIG. 5 illustrates a configuration of an address;

FIG. 6 illustrates a configuration of a branch history table;

DETAILED DESCRIPTION

Figure 1:
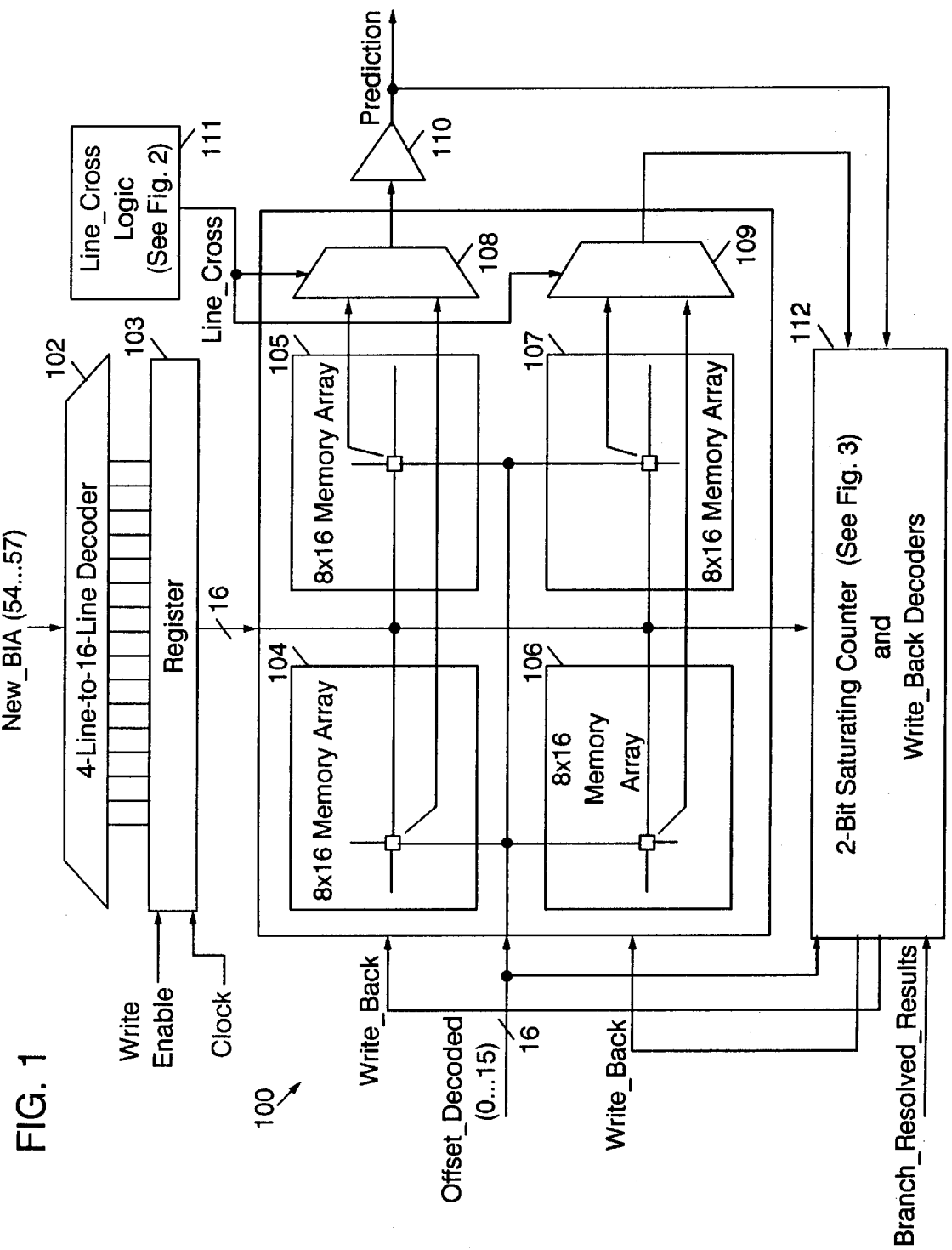
FIG. 1 illustrates, in block diagram form, a branch history table in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 8:
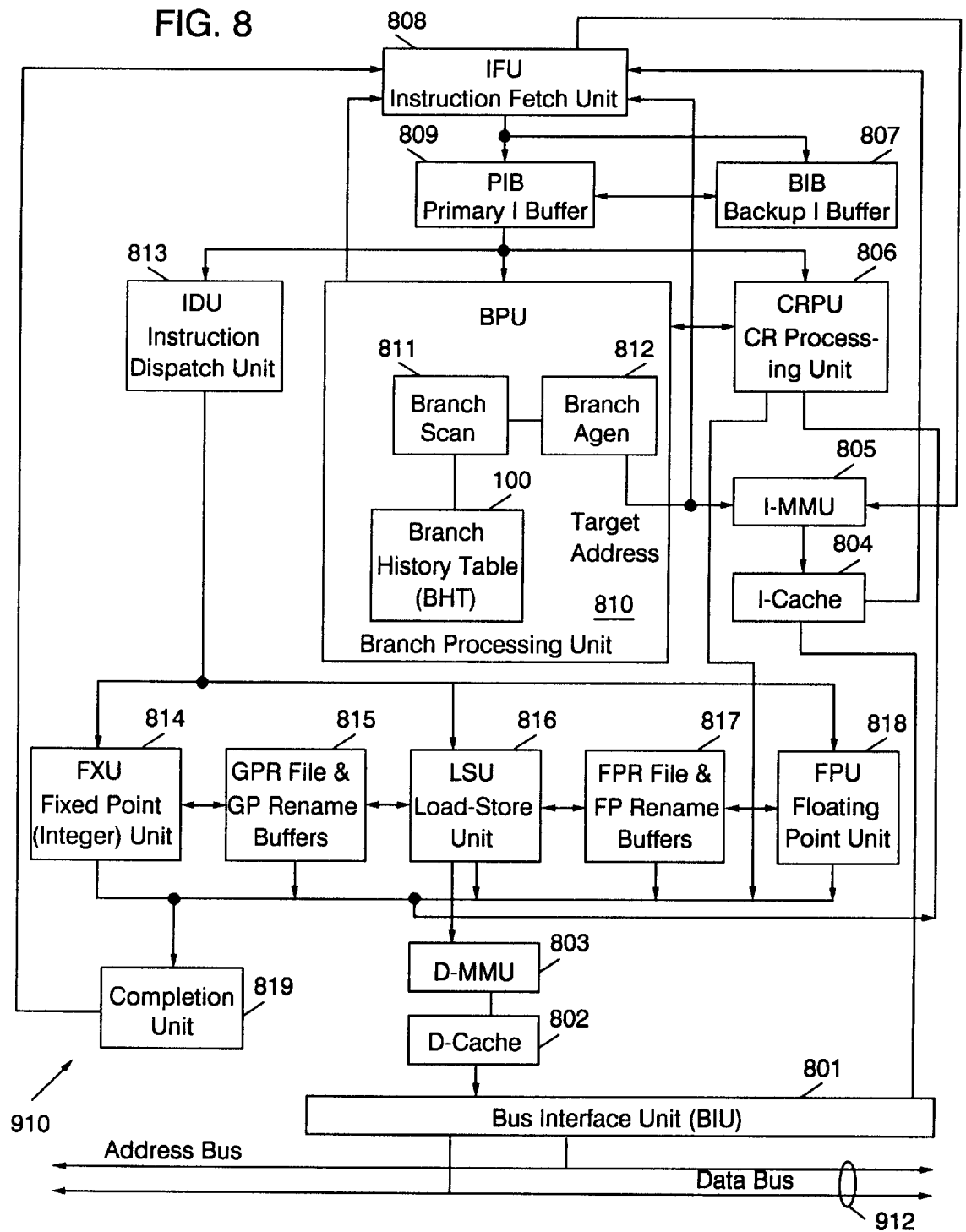
FIG. 8 illustrates a processor configured in accordance with the present invention.

Referring to FIG. 8, there is illustrated processor 910 coupled to bus 912 comprising an address bus and a data bus. Processor 910 may be any known central processing unit (e.g., a PowerPC processor made by IBM) and includes some of all of the circuitry shown in FIG. 8. Bus 912 is coupled to bus interface unit ("BIU") 801. Instruction cache ("I-cache") 804 is coupled to BIU 801 and to instruction fetch unit ("IFU") 808. I-cache 804, which may include tag bits, is also coupled to instruction memory management unit ("I-MMU") 805.

Processor 910 also contains branch processing unit ("BPU") 810, primary instruction buffer ("PIB") 809, and instruction dispatch unit ("IDU") 813.

BPU 810 includes branch scan logic 811, branch address generator ("BRANCH AGEN") 812, and BHT 100.

In a typical implementation, data is received from the data bus by BIU 801 and transferred through data cache ("D-cache") 802 to load-store unit ("LSU") 816. I-cache 804 receives instructions from BIU 801 and passes these on to IFU 808.

BPU 810 is operable for receiving branch instructions and performing look-ahead operations on conditional branches to resolve them early. PIB 809 receives instructions from IFU 808 and passes these on to IDU 813. IDU 813 is operable for dispatching instructions to any one of several execution units, such as LSU 816, floating point unit ("FPU") 818, and fixed point integer unit ("FXU") 814. These execution units are also coupled to completion unit 819, which tracks instructions from dispatch through execution, and then retires, or "completes" them in program order. Completion unit 819 contains a queue of completion buffers. Completion unit 819 is also coupled to IFU 808.

Also coupled to FPU 818 is FPR file and rename buffers 817.

Coupled to FXU 814 is general purpose register ("GPR") file 815 and associated general purpose ("GP") rename register buffers. Also coupled to BPU 810 is CR processing unit ("CRPU") 806.

Processor 910 may be a high-performance superscalar processor capable of issuing multiple instructions every cycle. During each clock cycle, IFU 808 attempts to fetch several instructions at one time, using the current BIA and offset. The default BIA is the next sequential address following the last instruction fetched in the previous cycle. However, the BIA may be modified by BPU 810, if a scanned branch is solved (or predicted) to be "taken."

Processor 910 may include backup instruction buffer ("BIB") 807, in addition to PIB 809 in some implementations.

Referring next to FIG. 5, a processor, such as the PowerPC processor, partitions addresses into a BIA and an offset. In the example shown, the BIA consists of 58 bits concatenated with a 4-bit offset. However, the present invention is not limited to this particular address structure. When IFU 808 fetches a number of instructions from I-cache 804, N sequential instructions will be fetched. As a result, all that is needed to be known by IFU 808 is the BIA and the offset of the first instruction within the stream of sequential instructions fetched from I-cache 804. As an example, 8 instructions may be fetched from I-cache 804 by IFU 808 using the BIA and concatenated offset associated with the first instruction within the fetched stream of instructions.

Referring next to FIG. 6, there is illustrated a depiction of an example of a BHT. As can be seen, the BHT illustrated in FIG. 6 includes 256 entries of two bits each (D1, D0), where N designates a prediction of "not taken," and T designates a prediction of "taken."

In the present invention, any one of various known prediction algorithms may be utilized. In one example, a prediction algorithm depicted as a state machine in FIG. 3 is utilized. The state machine in FIG. 3 illustrates how the values within the branch history table shown in FIG. 6 are updated once a branch has been resolved. This is shown by the solid-lined arrows. For example, if for a particular address such as address 00000000, the present prediction values (D1, D0) are TN, then when this branch history table is accessed for a prediction for address 00000000, a prediction of "taken" will be made. Upon resolution of the branch associated with address 00000000, the table entries could be updated to be TT if the branch was resolved to be "taken," while the table entries could be updated to be NT if this particular instruction is resolved to be "not taken."

As indicated in FIG. 3, if for a particular instruction address the table entries are NT or NN, the branch history table will output a prediction of "not taken." If for a particular instruction address the branch history table has an associated prediction values of either TN or TT, then the branch history table will output a prediction of "taken."

Returning to FIG. 6, note that with a branch history table having 256 entries, only 8 bits of an instruction address are required in order to address the BHT. Naturally, there may be significantly more than 256 instructions stored within the data processing system. This may be easily seen by noting the bit structure of the address illustrated in FIG. 5. As a result of the limited size of the BHT, only the offset plus a certain number of the least significant bits ("LSB") of the BIA are needed to address the BHT. In the example shown in FIG. 6, only the 4-bit offset plus the 4 LSBs of the BIA are used to address the BHT. Even though there is not a prediction stored within the BHT for each and every instruction address within the data processing system, this type of architecture still results in a very good prediction accuracy as has been proved by empirical results, which are not discussed herein. Of course, if the size of the BHT is increased or decreased, then the number of bits of the BIA utilized will be modified accordingly.

Referring next to FIG. 1, there is illustrated BHT 100 configured in accordance with the present invention. Using as an example a 256-entry BHT as described above with respect to FIG. 6, in which each entry has 2 bits for prediction values, as described above with respect to FIGS. 3 and 6, BHT 100 could be thought of as a small 16×16×2 memory device. A M×M×2 memory can be organized as 2 M×M subarrays, one on top of the other, each of which provides one bit data for each memory access. The present invention provides a novel memory organization using such subarrays, which allows for memory access to begin into BHT 100 even though the final branch instruction address has not yet been determined.

Typically, a group of N sequential instructions are fetched from I-cache 804 by IFU 808 into PIB 809. Then, branch scan unit 811 within branch processing unit 810 will scan PIB 809 for the first branch instruction within the N sequential instructions fetched. At this time, only the BIA and offset associated with the first instruction fetched by IFU 808 and stored within PIB 809 are known. Thus, if the first branch instruction scanned within PIB 809 is not the first instruction within the sequence fetched, then the instruction address associated with this scanned instruction will have to be determined in order to access BHT 100 for a prediction. As noted above, this is inefficient. The present invention is configured to improve the efficiency of a memory access in such a branch prediction scheme. What the present invention provides for is that access of BHT 100 may be begin immediately before the entire branch instruction address has been determined. This is accomplished by performing several processes in parallel.

In the present example, columns within BHT 100 are accessed using the 4-bit offset, while rows in BHT 100 are accessed with the 4 LSBs of the BIA (bits 54 ... 57). Since only 8 instructions have been fetched and stored within PIB 809, it is known that the row address (bits 54 ... 57) will be either BIA or BIA+1. In other words, it is known that, with respect to the address of the scanned branch instruction, that the BIA portion of the instruction address will be equal to the BIA of the first instruction within the sequence fetched, which is already known, or will be equal to BIA+1, due to the fact that the instructions fetched are in a sequential order. For example, if an instruction within PIB 809 that is in the position right before the scanned branch instruction has an offset of 1111, then the offset of the branch instruction, which is the next instruction within the sequence fetched, will have an offset of 0000. Consequently, the BIA associated with the scanned branch instruction having an offset of 0000 will have a value of one greater than the BIA associated with the previous instruction having an offset of 1111. This is often referred to in the art as a line crossing.

As a result of the foregoing, since the branch instruction scanned is not within the first position within the scanned sequence, it is not known whether or not this scanned instruction address has BIA or BIA+1 associated therewith. Furthermore, the offset associated with this scanned branch instruction is also not known at the beginning of the prediction cycle. All that is known is the BIA and the offset of the first instruction within the queue. Therefore, before BHT 100 can output a prediction for the scanned branch instruction, BPU 810 must calculate the offset and determine whether or not the scanned branch instruction has BIA or BIA+1. If access of BHT 100 were to be delayed until this information is known, then the prediction process will be delayed accordingly. As discussed above, the present invention permits the access of BHT 100 to begin immediately during the prediction cycle while independently and in parallel calculating the offset and making the determination of BIA or BIA+1.

Please note that one skilled in the art would be able to design a system in accordance with the present invention under circumstances where BHT 100 has a different number of memory entries, the number of instructions fetched is different than 8, and the instruction addresses are of a different length than described herein. It is possible that the present invention may be implemented so that a determination must be made between BIA and several iterations of BIA+M, where M is a positive or negative integer.

Since the row address can be either BIA or BIA+1, the data in these two rows can be accessed at the same time, and a selection made later when the decision signal determining whether or not BIA or BIA+1is associated with the branch instruction is ready. The memory within BHT 100 can be organized into 4 quadrants, in which the upper left quadrant 104 contains higher order bit D1 of state machine status with even address, the lower left quadrant 106 contains lower order bit D0 within even address, the upper right quadrant 105 contains higher order bit D1 of state machine status with odd address, and the lower right quadrant 107 contains lower order bit D0 with odd address. With 256 entries, each of memory arrays 104–107 is an 8×16 array. Each word line accesses four rows of data, two are D1 and D0 on BIA address, and the other are D1 and D0 on BIA+1 address. For example, if BIA is 0011, both the third and fourth rows of both D0 and D1 sections are selected. The data are then sensed and column selected using the computed offset as in a traditional memory. As the decision signal determining whether or not the branch instruction is associated with BIA or BIA+1 arrives from logic circuitry 111, the correct prediction data will be finally selected for output.

Each cell within the memory arrays 104–107 has one read port for branch prediction and two write ports for status update. Since BHT 100 is indexed directly from BIA, only those locations that are branch instructions are useful. When the program counter goes beyond (either forward or backward) the range of what the branch table stores, the contents of BHT 100 are not correct. They can at that time either be flushed with 0 or begun with the existing contents.

Figure 7:
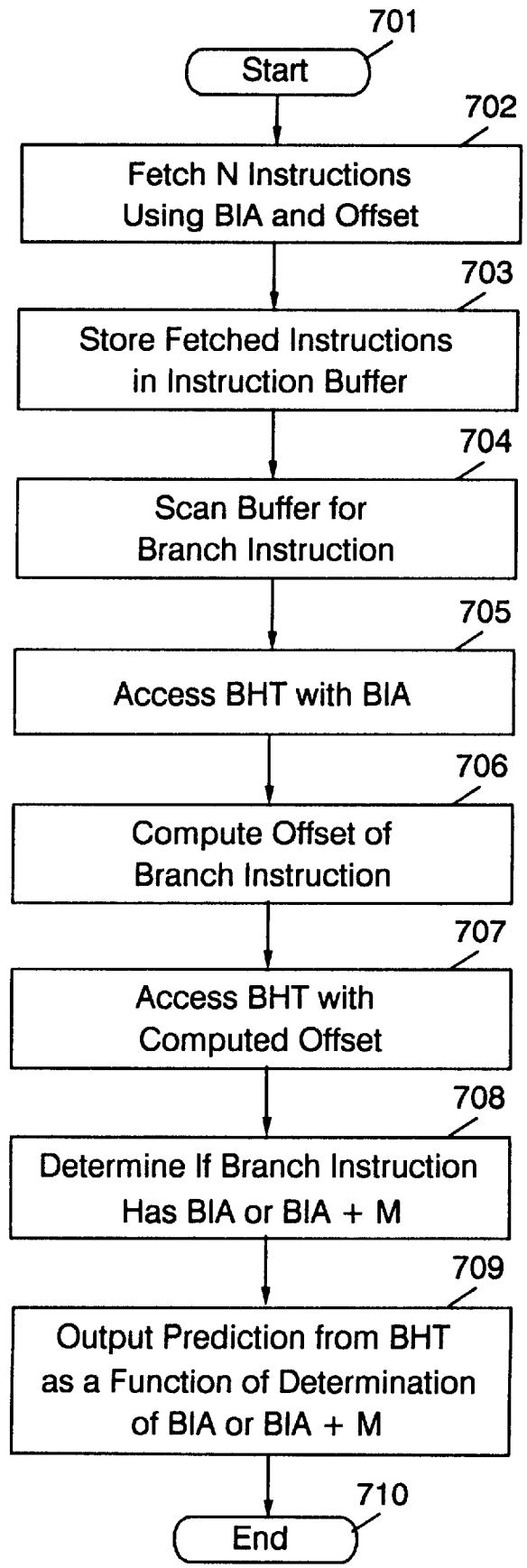
FIG. 7 illustrates a flow diagram of the present invention.

Referring to FIGS. 1 and 7 in parallel, in a branch prediction process (read-only process), the process begins at step 701 and proceeds to step 702 where N sequential instructions are fetched as described above using the BIA and offset of the first instruction within the sequence. The N sequential instructions fetched are stored within PIB 809 (step 703). A branch scan process as described above is then performed in step 704. Access of BHT 100 using the BIA begins with step 705 where the four LSBs from 54 to 57 of a new branch instruction address (BIA) are decoded into 16 word lines with decoder 102 and latched into 16-bit register 103. The decoded word line will select 4 rows from memory arrays 104–107, i.e., a row from each of arrays 104–107.

In step 706, the offset of the scanned branch instruction is computed and decoded in much the same manner as the BIA was decoded by decoder 102, using a process well-known in the art.

In step 707, arrays 104–107 are column accessed with this computed offset. Now, there are two sets of selected prediction status, one from the left hand arrays 104 and 106, and one from the right hand arrays of 105 and 107. The ultimate selection is determined by the line_cross signal from logic circuitry 111 into multiplexers 108 and 109. Multiplexer 108 receives the selections from arrays 104 and 105, which are the D1 prediction bits for BIA and BIA+1, while multiplexer 109 makes a selection between the D0 lower order bits for BIA and BIA+1, which are not needed for the prediction, but are supplied to logic block 112, which is further discussed below.

Figure 2:
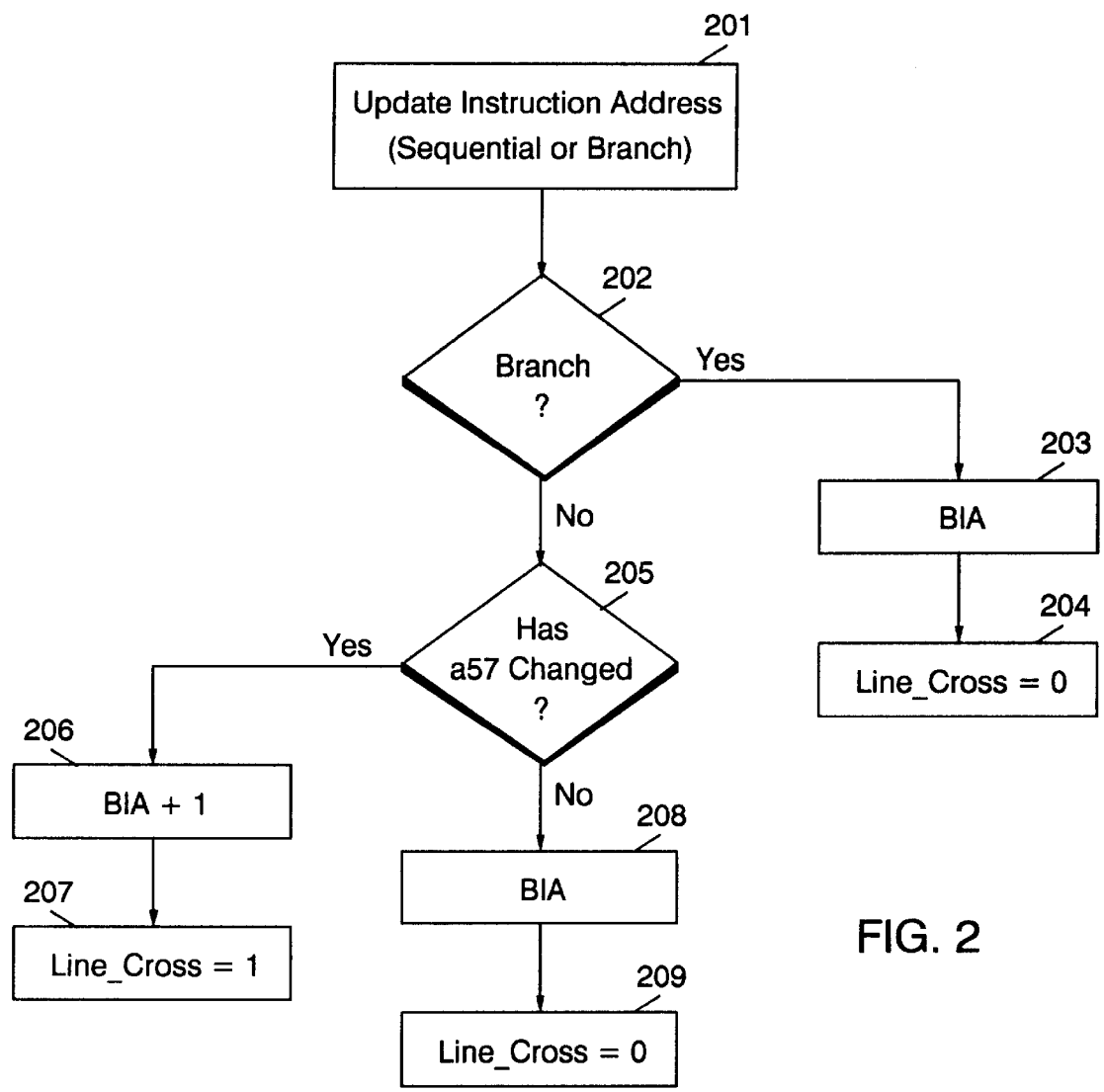
FIG. 2 illustrates a flow diagram of the line crossing logic.

The line_cross signal from logic signal is supplied from logic circuitry 111, which performs the step of deciding between BIA or BIA+M (in this example, M=1) as further illustrated in FIG. 2.

In step 201, the scanned branch instruction address is updated into a register (not shown). In step 202, it is determined whether or not this updated instruction address was the result of a branch being taken in a previous instruction, or is merely the result of the fetching of the next sequential address in the stream. If it is the result of a branch, the process proceeds to step 203 to determine that the address associated with this instruction is BIA, and therefore in step 204, signal line__cross is assigned a 0 value.

If in step 202, the updated instruction was not the result of a branch, the process proceeds to step 205 to determine if bit a57 (see FIG. 5) has changed. If not, then the updated instruction has an address of BIA and the line__cross signal will have a value of 0 (steps 208 and 209). However, if bit a57 has changed, then the updated instruction has an address of BIA+1 (step 206) and the line__cross signal will be given a value of 1 in step 207. If line__cross=1, data from the BIA+1 location is selected, while if the line__cross signal=0, then data from the BIA location is selected. The higher order bit (D1) of the chosen status is sent out as the prediction of either "taken" or "not taken"(step 709). This prediction is amplified with amplifier 110. The process then ends at step 710.

Referring to FIG. 4, the prediction is provided to the control block of a state machine sequencer. Acting on the prediction, IFU 808 fetches instructions at the branch target address and substitutes these for the sequential instructions following the branch instruction. The new instructions are available for dispatch and execution. These instructions are marked as dependent on the final resolution of the branch instruction, and they may be deleted and their consequences undone if the prediction proves wrong.

As any pending branch instruction is resolved (either "taken" or "not taken"), the corresponding status needs to be updated and written back to memory arrays 104–107. As described above, a saturated, count up/down two-bit counter is used as the update logic, or state machine (see FIG. 3).

The state machine increments or decrements its value depending on the branch being "taken" or "not taken." After updated, the new status of the BIA or BIA+1is written back to BHT 100. Logic circuitry 112 will include the state machine of FIG. 3 and write-back decoders of any well-known design in order to write the resolved prediction status bits into arrays 104–107 after the branch instruction has been resolved. One skilled in the art should be able to design the process within logic block 112 with the discussion provided herein.

Figure 9:
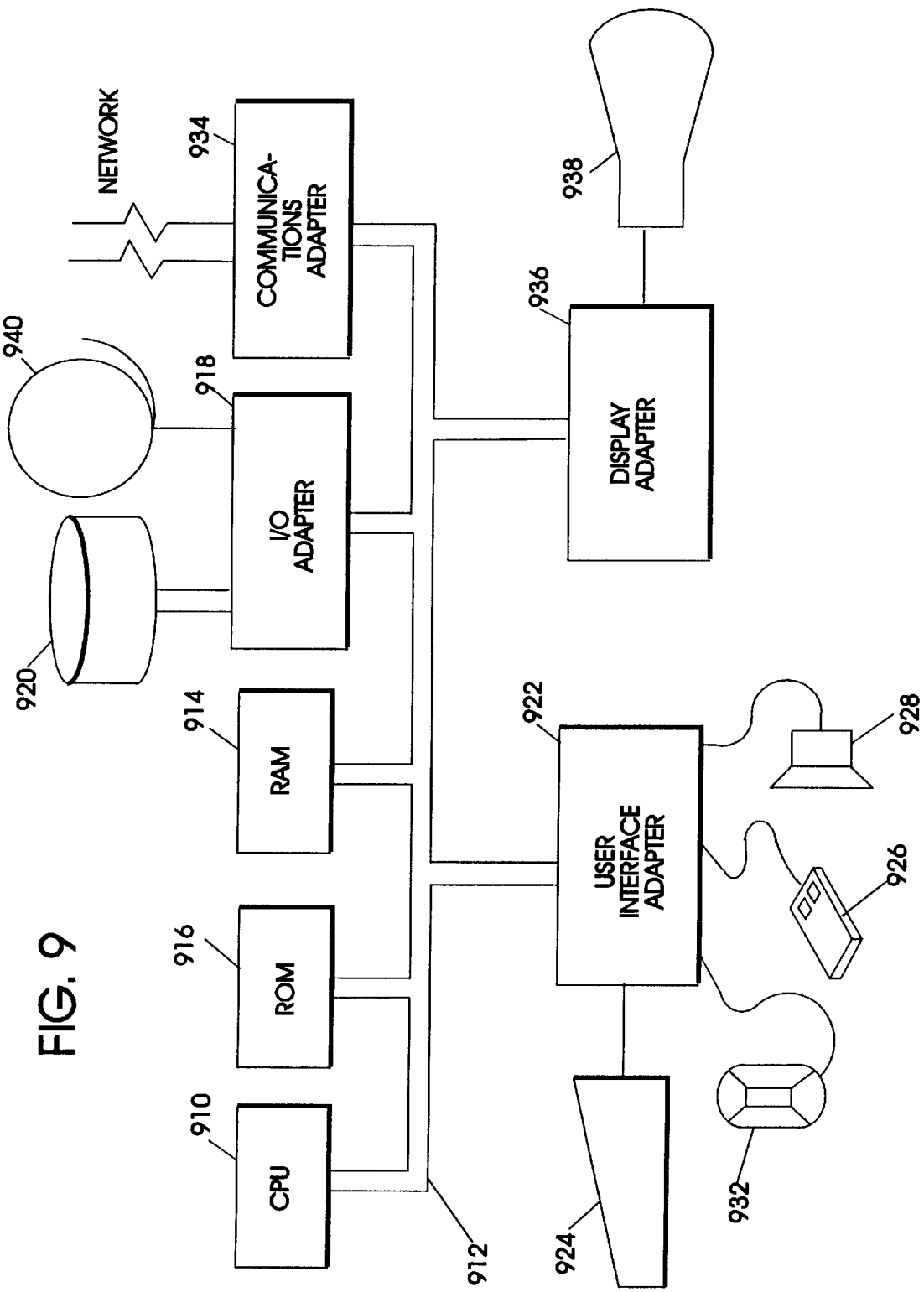
FIG. 9 illustrates a data processing system configured in accordance with the present invention.

A representative hardware environment for practicing the present invention is depicted in FIG. 9, which illustrates a typical hardware configuration of a workstation in accordance with the subject invention having central processing unit (CPU) 910 and a number of other units interconnected via system bus 912. The workstation shown in FIG. 9 includes random access memory (RAM) 914, read only memory (ROM) 916, and input/output (I/O) adapter 918 for connecting peripheral devices such as disk units 920 and tape drives 940 to bus 912, user interface adapter 922 for connecting keyboard 924, mouse 926, speaker 928, microphone 932, and/or other user interface devices such as a touch screen device (not shown) to bus 912, communication adapter 934 for connecting the workstation to a data processing network, and display adapter 936 for connecting bus 912 to display device 938.

Although the present invention and its advantages have been described in detail, it should be understood that various changes, substitutions and alterations can be made herein without departing from the spirit and scope of the invention as defined by the appended claims.

What is claimed is:

1. A processor comprising:
    an instruction fetch unit for fetching N sequential instructions with an instruction address and a first offset;
    an instruction buffer for storing said N sequential instructions;
    a branch scan unit for scanning said buffer for a first branch instruction;
    circuitry for accessing a branch history table using said instruction address;
    circuitry for accessing said branch history table using a second offset pertaining to said first branch instruction;
    circuitry for determining an address particular to said branch instruction; and
    circuitry for outputting, from said branch history table as a function of said determined address particular to said branch instruction, a prediction of whether or not said branch instruction will be taken.

2. The processor as recited in claim 1, wherein said instruction address and said first offset comprise an address of a first instruction in said N sequential instructions.

3. The processor as recited in claim 2, wherein said circuitry for accessing said branch history table and said determining circuitry perform their functions substantially in parallel.

4. The processor as recited in claim 3, wherein said determining circuitry further comprises:
    circuitry for determining whether said address particular to said branch instruction is equal to said instruction address or said instruction address plus M, wherein M is an integer.

5. The processor as recited in claim 4, wherein said branch history table comprises first and second memory arrays, wherein said first memory array is accessed by even numbered instruction addresses, and wherein said second memory array is accessed by odd numbered instruction addresses.

6. The processor as recited in claim 5, wherein said instruction address is used to access one of said first and second memory arrays, and wherein said instruction address plus M is used to access the other one of said first and second memory arrays.

7. The processor as recited in claim 6, wherein said outputting circuitry further comprises:
    a multiplexer for selecting (1) a first prediction stored in said first memory array and accessed by one of said instruction address or said instruction address plus 1, or (2) a second prediction stored in said second memory array and accessed by the other one of said instruction address or said instruction address plus 1, as a function of a signal received from said determining circuitry.

8. A data processing system comprising:
    a processor;
    a memory; and
    a bus coupling said processor to said memory, wherein said processor further comprises:
        an instruction fetch unit for fetching from said memory N sequential instructions with an instruction address and a first offset, wherein said instruction address and said first offset comprise an address of a first instruction in said N sequential instructions;
        an instruction buffer for storing said N sequential instructions;
        a branch scan unit for scanning said buffer for a first branch instruction;

circuitry for accessing a branch history table using said instruction address, wherein said instruction address is used to access one of said first and second memory arrays within said branch history table, and wherein said instruction address plus M is used to access the other one of said first and second memory arrays;

circuitry for accessing said branch history table using a second offset pertaining to said first branch instruction;

circuitry for determining whether an address particular to said branch instruction is equal to said instruction address or said instruction address plus M, wherein M is an integer, wherein said circuitry for accessing said branch history table and said determining circuitry perform their functions substantially in parallel; and circuitry for outputting, from said branch history table as a function of said determined address particular to said branch instruction, a prediction of whether or not said branch instruction will be taken.

9. In a data processing system, a method comprising the steps of:

fetching N sequential instructions with an instruction address and a first offset;

storing said N sequential instructions in a buffer;

scanning said buffer for a first branch instruction;

using said instruction address to access a branch history table;

computing a second offset of said first branch instruction;

using said second offset to access said branch history table;

determining an address particular to said branch instruction; and outputting, from said branch history table as a function of said determined address particular to said branch instruction, a prediction of whether or not said branch instruction will be taken.

10. The method as recited in claim 1, wherein said instruction address and said first offset comprise an address of a first instruction in said N sequential instructions.

11. The method as recited in claim 10, wherein said using and determining steps are performed substantially in parallel.

12. The method as recited in claim 11, wherein said determining step further comprises the step of:

determining whether said address particular to said branch instruction is equal to said instruction address or said instruction address plus M, wherein M is an integer.

13. The method as recited in claim 12, wherein M=1.

14. The method as recited in claim 10, wherein said using and determining steps are performed independently from each other.

15. The method as recited in claim 10, wherein said using, computing, and determining steps are performed substantially in parallel.

16. The method as recited in claim 9, wherein said branch history table comprises first and second memory arrays, wherein said first memory array is accessed by even numbered instruction addresses, and wherein said second memory array is accessed by odd numbered instruction addresses.

17. The method as recited in claim 16, wherein said instruction address is used to access both of said first and second memory arrays.

18. The method as recited in claim 17, wherein said instruction address is used to access one of said first and second memory arrays, and wherein said instruction address plus 1 is used to access the other one of said first and second memory arrays.

19. The method as recited in claim 18, wherein said outputting step further comprises the step of:

selecting (1) a first prediction stored in said first memory array and accessed by one of said instruction address or said instruction address plus 1, or (2) a second prediction stored in said second memory array and accessed by the other one of said instruction address or said instruction address plus 1, as a function of said determining step.

* * * * *